United States Patent [19]
Boustany

[11] 3,872,061
[45] Mar. 18, 1975

[54] DIAZACYCLODIONES

[75] Inventor: Kamel Boustany, Akron, Ohio

[73] Assignee: Monsanto Company, St. Louis, Mo.

[22] Filed: May 3, 1973

[21] Appl. No.: 356,778

Related U.S. Application Data

[63] Continuation of Ser. No. 56,682, July 20, 1970, abandoned.

[52] U.S. Cl.. 260/79.5 B, 260/79.5 A, 260/239 BC, 260/268 S, 260/268 DK, 260/780, 260/784, 260/791
[51] Int. Cl........................... C08d 9/00, C08c 11/54
[58] Field of Search.... 260/239 BC, 268 S, 268 DK, 260/79.5 A, 79.5 B, 780, 784, 791

[56] References Cited
UNITED STATES PATENTS

| | | | |
|---|---|---|---|
| 3,546,185 | 12/1970 | Coran | 260/79.5 |
| 3,686,169 | 8/1972 | Coran | 260/239.3 R |

*Primary Examiner*—Christopher A. Henderson

[57] ABSTRACT

Novel thio derivatives of diazacyclodiones are disclosed which are excellent inhibitors of premature vulcanization.

12 Claims, No Drawings

DIAZACYCLODIONES

This application is a continuation of application Ser. No. 56,682 filed July 20, 1970 now abandoned.

BACKGROUND OF THE INVENTION

This invention relates to methods for inhibiting premature vulcanization of rubber and to new compounds useful as premature vulcanization inhibitors. More particularly, this invention concerns thio derivatives of diazacyclodiones.

In the process of manufacturing rubber articles, rubber stocks comprising elastomers, fillers, vulcanizing agents, accelerators, antidegradants and other ingredients are prepared. Articles are then constructed from the rubber stocks and vulcanized to give the finished product. While preparing rubber stocks, the ingredients are vigorously mixed to insure uniform distribution of the materials. During the mixing step, high temperatures are encountered which sometimes cause the stock to partially vulcanize. Partial vulcanization also can occur while storing the stocks prior to the fabrication step. The rubber stocks are worthless whenever partial vulcanization occurs because articles can no longer be made from them. Partial vulcanization is commonly known as scorch or premature vulcanization. The rubber industry has developed a number of materials useful in inhibiting premature vulcanization. However, the quest for improved inhibitors continues.

SUMMARY OF THE INVENTION

The compounds of this invention are thio derivatives of diazacyclodiones which are excellent inhibitors of premature vulcanization. The carbonyl functions support the inhibiting property. The compounds are characterized by the formula

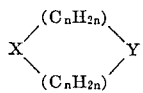

wherein X and Y are

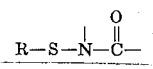

and where the alkylenes are linked either to the same or different elements in X and Y. Alkylene is a divalent radical derived from an aliphatic saturated hydrocarbon by the removal of two hydrogen atoms which radical has the general formula $C_nH_{2n}$. Straight and branched chain alkylene of 1 to 6 carbon atoms are suitable. R is a monovalent aliphatic or aromatic radical which may be the same or different in X and Y but preferably is the same. Suitable aliphatic radicals include straight or branched chain alkyl of 1 to 20 carbon atoms with lower alkyl of 1 to 10 carbon atoms being preferred. The aliphatic radical may contain an aromatic substituent. Alicyclic radicals of 5 to 12 carbon atoms are also suitable with cycloalkyl of 5 to 8 carbon atoms being preferred. Suitable aromatic radicals include phenyl and naphthyl which may contain aliphatic substituents.

Alkyl examples of R are methyl, ethyl, propyl, butyl, isobutyl, sec.-butyl, tert-butyl, amyl, sec,-amyl, hexyl, octyl, decyl, dodecyl and eicosyl. Aralkyl examples of R are benzyl, 1-phenethyl, -2-phenethyl, 2-phenyl propyl and 3-phenyl propyl. Cycloalkyl examples of R are cyclopentyl, cyclohexyl, cyclooctyl, cyclodecyl and cyclododecyl. Aryl examples are phenyl and naphthyl and alkaryl examples are tolyl, xylyl, ethyltolyl, ethyl phenyl, cumenyl and butyl phenyl.

Examples of alkylene radicals are methylene, dimethylene, trimethylene, tetramethylene, pentamethylene, hexamethylene, ethylidene, and propylidene.

Representative inhibitors of this invention are 1,4-di(methylthio)-2,5-piperazinedione, 1,4di(ethylthio)-2,5-piperazinedione, 1,4-di(octylthio)-2,5-piperazinedione, 1,4-di(dodecylthio)-2,5-piperazinedione, 1,4-di(butylthio)-2,5-piperazinedione, 1,4-di(propylthio)-2,5-piperazinedione, 1,4-di(amylthio)-2,5-piperazinedione, 1,4-di(isobutylthio)-2,5-piperazinedione, 1-(n-butylthio)-4-(methylthio)-2,5-piperazinedione, 1-(tert-butylthio)-4-(ethylthio)-2,5-piperazinedione and 1-(hexylthio)-4-(propylthio)-2,5-piperazinedione.

1,4-Di(cyclopentylthio)-2,5-piperazinedione, 1,4-di(cyclohexylthio)-2,5-piperazinedione, 1,4-di(cyclooctylthio)-2,5-piperazinedione, 1,4-di(cyclodecylthio)-2,5-piperazinedione, 1,4-di(cyclododecylthio)-2,5-piperazinedione, 1-(cyclopentylthio)-4-(cyclohexylthio)-2,5-piperazinedione, 1-(cyclohexylthio)-4-(cyclooctylthio)-2,5-piperazinedione, 1-(ethylthio)-4-(cyclopentylthio)-2,5-piperazinedione, 1-(butylthio)-4-(cyclohexylthio)-2,5-piperazinedione, 1-(tert-butylthio)-4-(cyclohexylthio)-2,5-piperazinedione, 1-(cyclooctylthio)-4-(propylthio)-2,5-piperazinedione and 1-(cyclodecylthio)-4-(decylthio)-2,5-piperazinedione.

Other examples are 1,4-di(benzylthio)-2,5-piperazinedione, 1,4-di(xylylthio)-2,5-piperazinedione, 1,4-di(phenethylthio)-2,5-piperazinedione, 1,4-di(cumenylthio)-2,5-piperazinedione, 1-(benzylthio)-4-(hexylthio)-2,5-piperazinedione, 1-(benzylthio)-4(cyclohexylthio)-2,5-piperazinedione, 1-(benzylthio)-4 (xylylthio)-2,5-piperazinedione and 1-(benzylthio)-4-(phenethylthio)-2,5-piperazinedione.

Further examples are 1,4-di(phenylthio)-2,5-piperazinedione, 1,4-di(naphthylthio)-2,5-piperazinedione, 1,4-di(tolylthio)-2,5-piperazinedione, 1,4-di(ethylphenylthio)-2,5-piperazinedione, 1-(methylthio)-4-(phenylthio)-2,5-piperazinedione, 1-(cyclohexylthio)-4-(phenylthio)-2,5piperazinedione, 1-(benzylthio)-4 (phenylthio) 2,5-piperazinedione and 1-(butylthio)-4-(phenylthio)-2,5-piperazinedione.

Other examples are 1,4-di(cyclohexylthio)tetrahydro-1(H)-diazepine-2,5-dione, 1,4-di(phenylthio)tetrahydro-1(H)-diazepine-2,5-dione, 1,4-di(isopropylthio)tetrahydro-1(H)-diazepine-2,5-dione, 1,4-di(cyclopentylthio)tetrahydro-5(H)-diazepine-5,7(6H)-dione, 1,4-di(phenylthio)-tetrahydro-5(H)-diazepine-5,7(6H)-dione, 1,4-di(isobutylthio)tetrahydro-5(H)-diazepine-5,7(6H)-dione, 1,4-di(cyclooctylthio)-6(ethyl)tetrahydro-5(H)-diazepine-5,7(6H)-dione, 1,4-di(phenylthio)-6(ethyl)tetrahydro-5(H)-diazepine-5,7(6H)-dione, 1,-4-di(methylthio)-6(ethyl)tetrahydro-5(H)-diazepine-5,7(6H)-dione, 1,5-di(cyclohexylthio)tetrahydrodiazocine-2,6(1H, 3H)-dione, 1,5-di(phenylthio)tetrahydrodiazocine-2,6(1H, 3H)-dione, 1,5-di(ethylthio)tetrahydrodiazocine-2,6(1H, 3H)-dione, 1,4-di(cyclohexylthio)hexahydrodiazocine-5,8-dione, 1,4-di(naphthylthio)-hexahydrodiazocine-5,8-dione, 1,4- di(isopropylthio)hexahydrodiazocine-5,8-dione, 1,4-di(cyclodecylthio)hexahydrodiazocine-2,5-dione, 1,4-di(phenylthio)hexahydrodiazocine-2,5-dione, 1,4-di(hexylthio)hexahydro-diazocine-2,5-dione, 1,5-di(cyclohexylthio)tetrahydrodiazocine-2,4(1H, 3H)-dione, 1,5-di(phenylthio)tetrahydrodiazocine-2,4(1H, 3H)-dione, 1,5-di(butylthio)tetrahydrodiazocine-2,4(1H, 3H)-dione, 1,5-di(cyclohexylthio)hexahydro-2(H)-diazonine-2,4(3H)-dione, 1,5-di(phenylthio)hexahydro-2(H)-diazonine-2,4-3H)-dione, 1,5-di(isopropylthio)hexahydro-2(H)-diazonine-2,4(3H)-dione, 1,5-di(cyclohexylthio)tetrahydro-1(H)-diazonine-2,6(3H, 7H)-dione, 1,5-di(phenylthio)tetrahydro-1(H)-diazonine-2,6-(3H, 7H)-dione, 1,5di-(tert-butylthio)tetrahydro-1(H)-diazonine-2,6(3H, 7H)-dione, 1,4-di(cyclohexylthio)tetrahydrodiazonine-5,9(4H, 6H)-dione, 1,4-di(phenylthio)tetrahydrodiazonine-5,9(4H, 6H)-dione, 1,4-di(isopropylthio)tetrahydrodiazonine-5,94H, 6H)-dione, 1,5-di(cyclohexylthio)hexahydrodiazecine-2,6(1H, 3H)-dione, 1,5-di(phenylthio)hexahydrodiazecine-2,6(1H, 3H)-dione, 1,5-di(isopropylthio)hexahydrodiazecine-2,6(1 H, 3H)-dione, 1,5-di(cyclohexylthio)-hexahydrodiazecine-6,10(1H, 7H)-dione, 1,5-di(phenylthio)hexahydrodiazecine-6,10(1H, 7H)-dione, 1,5-di(octylthio)hexahydrodiazecine-6,10-(1H, 7H)-dione, 1,6-di(cyclohexylthio)octahydrodiazecine-2,7-dione, 1,6-di(phenylthio)octahydrodiazecine-2,7-dione, 1,6-di(isopropylthio)-octahydrodiazecine-2,7-dione, 1,5-di(cyclohexylthio)hexahydrodiazecine-2,4(1H, 3H)-dione, 1,5-di(phenylthio)hexahydrodiazecine-2,4(1H, 3H)-dione, 1,5-di(isopropylthio)hexahydrodiazecine-2,4(1H, 3H)-dione, 1,4-di(cyclohexylthio)octahydrodiazecine-5,10-dione, 1,4-di(phenylthio)-octahydrodiazecine-5,10-dione, 1,4-di(dodecylthio)octahydrodiazecine-5,10-dione, 1,5-di(cyclohexylthio)diazacycloundecane-2,4-dione, 1,5-di(phenylthio)diazacycloundecane-2,4-dione, 1,5-di(isopropylthio)diazacycloundecane-2,4-dione, cycloundecane-2,4-dione, 1,5-di(cyclohexylthio)diazacycloundecane-2,6-dione, 1,5-di(phenylthio)diazacycloundecane-2,6-dione, 1,5-di(isopropylthio)diazacycloundecane-2,6-dione, 1,6-di(cyclohexylthio)diazacycloundecane-2,7-dione, 1,6-di(phenylthio)diazacycloundecane-2,7-dione, 1,6-di(pentylthio)diazacycloundecane-2,7-dione, 1,6-di(cyclohexylthio)-diazacyclododecane-7,12-dione, 1,6-di(phenylthio)diazacyclododecane-7,12-dione, 1,-6-di(propylthio)diazacyclododecane-7,12-dione, 1,7-di(cyclohexylthio)diazacyclododecane-2,8-dione, 1,7-di(phenylthio)-diazacyclododecane-2,8-dione, 1,7-di(isopropylthio)diazacyclododecane-2,8-dione, 1,7-di(cyclohexylthio)diazacyclotridecane-2,8-dione, 1,7-di(phenylthio)diazacyclotridecane-2,8-dione, 1,7-di(isopropylthio)diazacyclotridecane-2,8-dione, 1,7-di(cyclooctylthio)diazacyclotetradecane-8,14-dione, 1,7-di(phenylthio)diazacyclotetradecane-8,14 dione, 1,7-di(isopropylthio)diazacyclotetradecane-8,14-dione, 1,8-di(cyclohexylthio)diazocyclotetradecane-2,9-dione, 1,8-di(phenylthio)diazocyclotetradecane-2,9-dione, 1,8-di(isopropylthio)diazocyclotetradecane-2,9-dione, 1,8-di(cyclopentylthio)diazocyclotetradecane-2,7-dione, 1,8-di(phenylthio)diazocyclotetradecane-2,7-dione, 1,8-di(isopropylthio)diazocyclotetradecane-2,7-dione, 1,-8-di(cyclohexylthio)diazocyclohexadecane-9,16-dione, 1,8-di(phenylthio)diazocyclohexadecane-9,16-dione, and 1,8-di(isopropylthio)diazocyclohexadecane-9,16-dione.

The inhibitors of this invention are effective in rubber stocks containing the common elastomers, vulcanizing agents, accelerators, antidegradants and reinforcing agents. The inhibitors may be used with natural rubber, sulfur vulcanizable synthetic rubber or mixtures thereof. Suitable synthetic rubbers are styrene-butadiene copolymer (SBR), isobutylene-isoprene copolymer (butyl), ethylene-propylene diene terpolymers (EPDM), butadiene-acrylonitrile copolymer (nitrile), polymers of chloroprene (neoprene) and synthetic polyisoprene. Stocks containing sulfur or sulfur-containing vulcanizing agents are inhibited by incorporating the compounds of this invention. The inhibitors are active in stocks containing sulfenamide accelerators, particularly the benzothiazole type, and are active in stocks containing accelerators of the dithiocarbamate, monosulfude and disulfide thiuram, and thiazole disulfide types. Stocks containing accelerator systems using aldehyde amine condensation products and guanidine derivatives are also improved. Stocks containing phenolic, ketone, ether and phenylenediamine antidegradants are substantially improved by the method of this invention.

The amount of inhibitor required depends upon the composition of the stock and the heat history of the stock up to the time of vulcanization. Generally, the quantity is between 0.1 to 5.0 parts inhibitor per 100 parts rubber. Under extreme conditions, even larger amounts may be needed. In most applications, 0.1 to 0.7 parts are sufficient. Because of the extremely high activity of the present inhibitors, the amount of inhibitor required is less than the amount normally used with known inhibitors.

DESCRIPTION OF PREFERRED EMBODIMENTS

The inhibitors are prepared by reacting the appropriate sulfenyl chloride with a diazacyclodione in the presence of an acid acceptor. The product is then separated by conventional means and purified if desired. If bis substituted products are desired, two moles of sulfenyl chloride is reacted with one mole of diazacyclodione. When unsymmetrical products are desired, one mole of diazacyclodione is reacted first with one mole of one sulfenyl chloride and then reacted with one mole of another sulfenyl chloride.

Illustrative examples of diazacyclodiones suitable in the practice of this invention are 2,5-piperazinedione, tetrahydro-1(H),1,4-diazepine-2,5-dione, tetrahydro-5(H),1,4-diazepine-5,7(6H)-dione, 6(ethyl)tetrahydro-5(H),1,4-diazepine-5,7(6H)-dione, tetrahydro-1,5-diazocine-2,6(1H,3H)-dione, hexahydro-1,4-diazocine-5,8-dione, hexahydro-1,4-diazocine-2,5-dione, tetrahydro-1,5-diazocine-2,4(1H,3H)-dione, hexahydro-2(H),1,5-diazonine-2,4(3H)-dione, tetrahydro-1(H),1,5-diazonine-2,6(3H,7H)-dione, tetrahydro-1,4-diazonine-5,9(4H,6H)-dione, hexahydro-1,5-diazecine-2,6(1H,3H)-dione, hexahydro-1,5-diazecine-6,10(1H,7H)-dione, octahydro-1,6-diazecine-2,7-dione, hexahydro-1,5diazecine-2,4(1H,3H)-dione, octahydro-1,4-diazecine-5,10-dione, 1,5-diazacycloundecane-2,4-dione, 1,5-diazacycloundecane-2,6-dione, 1,6-diazacycloundecane-2,7-dione, 1,6-diazacyclododecane-7,12-dione, 1,-

7-diazacyclododecane-2,8-dione, 1,7-diazacyclotridecane-2,8-dione, 1,7-diazacyclotetradecane-8,14-dione, 1,8-diazocyclotetradecane-2,9-dione, 1,8-diazocyclotetradecane-2,7-dione, 1,8-diazocyclohexadecane-9,16-dione.

The synthesis of 1,4-di(cyclohexylthio)-2,5-piperazinedione is conducted as follows: To 0.05 mole (5.5 g.) of 2,5-piperazinedione in 200 ml. of dimethylformamide are added 0.1 mole cyclohexyl sulfenyl chloride in 100 ml. of hexane and 0.2 mole triethylamine. After stirring the mixture for four hours at room temperature, 500 ml. of water is added. The mixture is then filtered to recover a white solid which is washed with hexane and allowed to dry (yield 6.8 grams). The solid is washed with dilute HCl to remove any unreacted dione and dried. 6.4 Grams of 1,4-di(cyclohexylthio)-2,5-piperazinedione, m.p. 155°–156°C., is recovered. Nuclear magnetic resonance spectral analysis confirms the identification. Chemical analysis gives 56.23% C, 7.68% H, 8.17% N and 18.77% S compared to 56.10% C, 7.65% H, 8.18% N and 18.72% S calculated for $C_{16}H_{26}N_2O_2S_2$.

1,4-Di(phenylthio)-2,5-piperazinedione is prepared by adding dropwise 0.2 mole benzene sulfenyl chloride to a solution of 0.10 mole of 2,5-piperazinedione and 30 grams of triethylamine in 150 ml. of dimethylformamide at 40°C. The mixture is stirred for 2 hours at 40°C. and then quenched with ice. The mixture is filtered to recover a brown precipitate. The brown solid is washed with aqueous HCl and then is washed with hot methanol. 26.0 Grams of crude product is recovered which melts at 159°–164°C. Recrystallized from benzene, the 1,4-di-(phenylthio)-2,5-piperazinedione is a silver colored solid, m.p. 171.0°–0.5°C. Analysis gives 58.67% C, 4.33% H, 8.51% N and 19.81% S compared to 58.16% C, 4.27% H, 8.48% N and 19.41% S calculated for $C_{16}H_{14}N_2O_2S_2$.

The preparation of 1,4-di(isopropylthio)-2,5-piperazinedione is carried out as follows: To 0.05 mole of isopropyl sulfenyl chloride in 100 ml. of benzene is added in small portions at room temperature a solution of 0.025 mole of 2,5-piperazinedione in 50 ml. of benzene. After the reaction mixture is stirred for one hour, 0.05 mole of triethylamine is added and the mixture stirred overnight. The solution is heated to 50°C. and filtered to remove triethylamine salt. Benzene is removed from the filtrate by evaporation. The residue is slurried in hexane and washed with water to remove impurities. The product is recovered by filtration and allowed to dry. The 1,4-di(isopropylthio)-2,5-piperazine-dione is a brown solid, m.p. 104°–8°C. Identification is confirmed by nuclear magnetic resonance spectral analysis.

The inhibition of premature vulcanization of rubber stocks containing the inhibitors of this invention is illustrated below. A natural rubber masterbatch is prepared by mixing the following ingredients (all portions by weight). 100 Parts natural rubber smoked sheets, 45 parts intermediate super abrasion furnace carbon black, 3 parts zinc oxide, 2 parts stearic acid and 5 parts hydrocarbon softener. To a portion of the natural rubber masterbatch is added 2.2 parts sulfur and 0.5 parts N-tert-butyl-2-benzothiazolesulfenamide (Stock A). To another portion of the masterbatch the same amount of sulfur and accelerator as in Stock A are added along with 0.25 parts 1,4-di(cyclohexylthio)-2,5-piperazinedione (Stock B). The scorch properties of the stocks at 121°C. are determined by a Mooney plastometer and the time in minutes ($t_5$) required for the Mooney reading to rise five points above the minimum viscosity is recorded. Longer times on the Mooney scorch tests indicate greater processing safety and are indicative of inhibitor activity. The cure characteristics of the stocks are determined at 144°C. by a Monsanto Oscillating Disk Rheometer and recorded. $t_2$ is the time in minutes required for a rise of two Rheometer units above the minimum reading and $t_{90}$ is the time required to obtain 90 percent of the Rheometer maximum torque. $t_{90}$-$t_2$ is indicative of the cure rate. The physical properties are measured on a vulcanizate prepared by heating the stock at 144°C. in a press for the time required to achieve optimum cure as determined from Rheometer data. The data obtained for Stocks A and B are shown in Table I.

TABLE I

| Mooney at 121°C. | Stock A | Stock B |
| --- | --- | --- |
| $t_5$ | 31.5 | 78.8 |
| % Increase in Scorch Delay | — | 150 |
| Rheometer at 144°C. | | |
| $t_2$ | 9.6 | 18.6 |
| $t_{90}$-$t_2$ | 14.4 | 16.4 |
| 300% Modulus, psi | 1360 | 1340 |
| Ultimate tensile strength, psi | 3650 | 3600 |

In a similar stock containing 0.25 parts 1,4-di(cyclohexylthio)-piperazine, the percent increase in scorch delay is 91 percent. The presence of the carbonyl radicals in the compound of this invention increases the processing safety about 60 percent.

A synthetic rubber masterbatch is prepared by mixing 137.5 parts oil-extended styrene-butadiene rubber, 65 parts intermediate super abrasion furnace carbon black, 1 part stearic acid, 3 parts zinc oxide and 1.5 parts hydrocarbon softener. To a portion of the SBR masterbatch is added 2.0 parts sulfur, 1.0 part N-tert-butyl-2-benzo-thiazolesulfenamide and 2.0 parts of N-(1,3-dimethylbutyl)-N'-phenyl-p-phenylenediamine (Stock C). To another portion of the masterbatch the same amount of sulfur, accelerator and antidegradant as in Stock C are added along with 0.25 parts 1,4-di(cyclohexylthio)-2,5-piperazinedione (Stock D). The scorch properties are determined by a Mooney plastometer at 135°C. and the cure characteristics of the stocks are determined at 153°C. by a Monsanto Oscillating Disk Rheometer. Vulcanizates are prepared from the stocks by press curing at 153°C. The data are shown in Table II.

TABLE II

| Mooney at 135°C. | Stock C | Stock D |
| --- | --- | --- |
| $t_5$ | 21.0 | 33.6 |
| % Increase in Scorch Delay | — | 60 |
| Rheometer at 153°C. | | |
| $t_2$ | 11.0 | 14.6 |
| $t_{90}$-$t_2$ | 17.0 | 19.5 |
| 300% Modulus, psi | 1000 | 990 |
| Ultimate tensile strength, psi | 2750 | 2810 |

To a portion of the natural rubber masterbatch is added 2.2 parts sulfur, 0.5 parts N-tert-butyl-2-benzothiazolesulfenamide and 2.0 parts of N-(1,3-dimethylbutyl)-N'-phenyl-p-phenylenediamine (Stock E). To another portion of the masterbatch the same amount of sulfur, accelerator and antidegradant as in Stock E are added along with 0.5 parts 1,4-di(phenylthio)-2,5-piperazinedione (Stock F). To another portion of the masterbatch the same amount of sulfur, accelerator and antidegradant as in Stock E are added along with 0.65 parts 1,4-di-(isopropylthio)-2,5-piperazinedione (Stock G). The properties of the stocks and vulcanizates are determined as previously described and recorded. The data are shown in Table III.

TABLE III

| Mooney at 121°C. | Stock E | Stock F | Stock G |
| --- | --- | --- | --- |
| $t_5$ | 30.7 | 70.0 | 100.0 |
| % Increase in Scorch Delay | — | 128 | 218 |
| Rheometer at 144°C. | | | |
| $t_2$ | 10.5 | 18.5 | — |
| $t_{90}-t_2$ | 15.5 | 16.5 | — |
| Rheometer maximum torque | — | — | 72 |
| 300% Modulus, psi | 1500 | 1450 | — |
| Ultimate tensile strength, psi | 3640 | 3680 | — |

Although the invention has been illustrated by typical examples, it is not limited thereto. Changes and modifications of the examples of the invention herein chosen for purposes of disclosure can be made which do not constitute departure from the spirit and scope of the invention.

The embodiments of the invention in which an exclusive property or privilege is claimed are defined as follows:

1. A method of inhibiting premature vulcanization of vulcanizable rubber containing sulfur or sulfur-containing vulcanizing agent and an accelerating agent selected from the group consisting of thiazole accelerators, dithiocarbamate accelerators, thiuram sulfide accelerators, aldehyde-amine accelerators and guanidine accelerators which comprises: incorporating therein, in an amount effective to inhibit premature vulcanization, a six membered ring compound of the formula

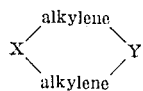

in which X and Y are

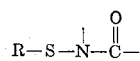

and are linked to each ring carbon atom through the same or different elements, $n$ is 1–6, and R is alkyl of 1–20 carbon atoms, aralkyl of 7–10 carbon atoms, cycloalkyl of 5–12 carbon atoms, alkaryl of 7–10 carbon atoms, phenyl or naphthyl.

2. The method according to claim 1 where the two nitrogen atoms are linked to the same ring carbon atom and the two carbonyl radicals are linked to the other ring carbon atom.

3. The method according to claim 1 where both ring carbon atoms are linked to a nitrogen atom and a carbonyl radical.

4. The method of claim 3 wherein the vulcanizing agent is sulfur and the accelerating agent is a benzothiazole sulfenamide.

5. The method according to claim 4 where $n$ is 1–4.

6. The method according to claim 5 where $n$ is 1.

7. The method according to claim 5 where $n$ is 2.

8. The method according to claim 6 where R is cycloalkyl of 5–8 carbon atoms.

9. The method according to claim 8 where R is cyclohexyl.

10. The method according to claim 6 where R is phenyl.

11. The method according to claim 6 where R is alkyl of 1–10 carbon atoms.

12. The method according to claim 11 where R is isopropyl.

* * * * *